Aug. 21, 1928.

C. ACHENBACH 1,681,565

HORN DEFLECTOR

Filed June 29, 1927

Inventor:
Charles Achenbach
By
Charles Turner Brown,
Attorney

Patented Aug. 21, 1928.

1,681,565

UNITED STATES PATENT OFFICE.

CHARLES ACHENBACH, OF MANITOWOC, WISCONSIN.

HORN DEFLECTOR.

Application filed June 29, 1927. Serial No. 202,303.

This invention relates to means for deflecting the horns of neat stock, including males, oxen and cows.

Among the objects of the invention is to provide a device whereby a determined curvature, and direction of curvature of the horns of neat stock may be obtained, for the double purpose of lessening the danger of animals inflicting injury upon each other and upon persons coming in close contact with and going among said animals and of improving the appearance of said stock, particularly of cows in a dairy herd. An additional object is to obtain a device whereby the horns of neat stock may be deflected without injury and without serious pain or inconvenience to the animal on which the device is applied. An additional object is to obtain a device of the kind named which is economical in construction, is easily applied to an animal, which is durable, not liable to be broken or get out of order, and which will not be displaced or accidentally removed from the animal, or from its adjusted position on the horns of the animal.

Figure 1:
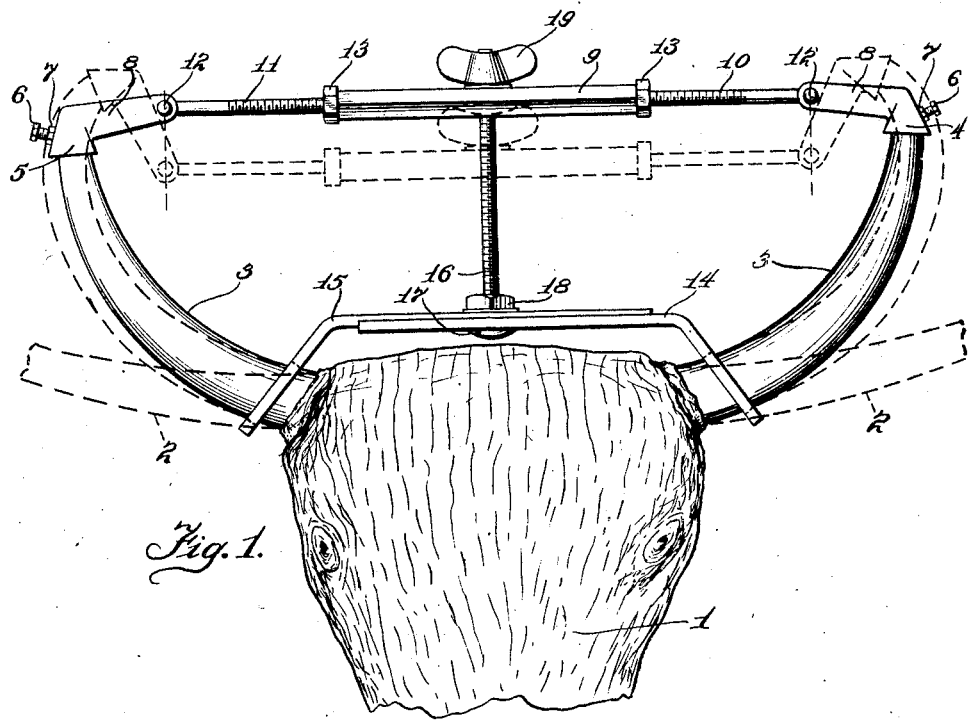

In the drawing referred to Fig. 1 is a front view of a construction embodying the invention, with so much of the head and horns of an animal on which the construction is illustrated as applied as is necessary to understand said construction and manner of application.

Figure 2:
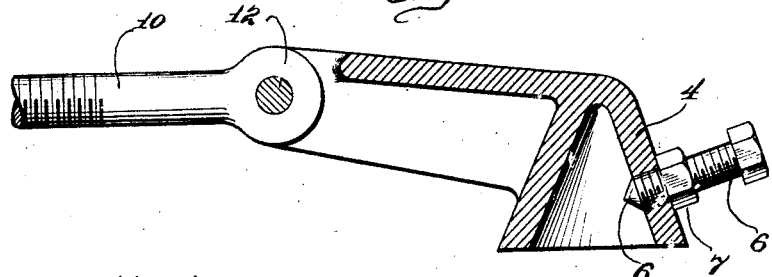

Fig. 2 is a vertical section of the construction illustrated in Fig. 1, showing one end of said construction.

Figure 3:
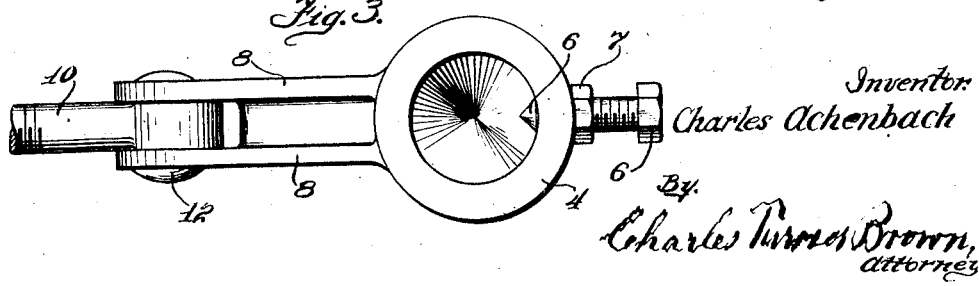

And Fig. 3 is a bottom plan view of the members of the device which are illustrated in Fig. 2.

A reference character applied to designate a given part indicates said part throughout the several figures of the drawing wherever the same appears.

1 represents a portion of the head of an animal. 2 are broken lines indicating the direction in which horns to which the device may be applied, at times grow. 3 represent horns which have been partially deflected by the application thereto of the device embodying this invention. 4, 5, respectively represent a metal cup which is adapted to be applied on the ends, or tips, of the horns of an animal. 6 represents set bolts in cups 4 and 5, respectively, and 7 set nuts on said bolts. 8 represents arms on cups 4 and 5, respectively, which are rigidly joined thereto, and preferably are integral therewith. 10, 11, represent screw threaded bolts which are provided with screw threads corresponding with and fitting into internal screw threads in turn-buckle 9. The internal screw threaded ends of turn-buckle 9 are joined by bars, integral therewith, in the usual construction of turn-buckles. 12 represents pins or rivets, which pivotally join bolts 10, 11 to arms 8. 13 represents set nuts on bolts 10, 11, respectively. 14, 15, represent additional members which are applied to an animal's horns after the limit of deflection which is possible by the application of members 4 to 11, both inclusive, has been attained, or the deflection desired has been reached, and a further deflection or curvature is wanted; such further curvature being to give an inward curve to the horns. These additional members are, ordinarily applied only to cows in a dairy herd. Members 14, 15, are slidable longitudinally on each other, and are provided with longitudinally extending slots. 16 represents a screw threaded bolt which is extendible through the slots in members 14, 15, and between the bars of the turn-buckle 9. 17 represents the head at one end of bolt 16, which prevents the bolt from passing through the slots in members 14, 15, and 18 represents a set nut on bolt 16, by means of which the said members are held rigidly in an adjusted position on the horns of an animal. 19 represents a nut on bolt 16, and by said nut the distance apart of turn-buckle 9 and bolts 10, 11, and the members 14, 15, is controlled. Members 9, 10, 11, and members 14, 15, are at all times substantially parallel.

To deflect or change the direction of the horns of an animal from, say, the position indicated by the broken lines 2 to the position illustrated by the lines 3, the cups 4, 5 are placed and secured on the ends of the horns, as by bolts 6 and set nuts 7, and the turn-buckle 9 is turned to obtain a strain or pull in the desired direction on the horns, and allowed to remain for the necessary period of time to release said strain, by the deflection of the horns, and thereupon the turn-buckle is again turned to cause an additional strain or pull on the horns. In the case of young stock, say not more than two years old, I find in practice the turn-buckle must be turned to renew the strain on the horns about every forty eight hours, as by that time all strain or pull is overcome by the deflection or change of direction of the horns. At each turning of the turn-buckle the set nuts 13 must be turned or set against the ends of the turn-buckle, to be certain the strain or pull is not released by the turning of the turn-buckle, either by the efforts of the animal or by accident.

After the desired curvature of the horns has been obtained by members 4, 5, 9, 10 and 11, the apparatus is removed from the horns of the animal and members 14, 15 are placed on the horns properly adjusted, and the bolt 16 and nut 18 are put in place and said nut is firmly turned down on to said members 14, 15 to hold them in their adjusted position. Cups 4 and 5 are then replaced on the ends of the horns and firmly secured by bolts 6 and set nuts 7, and the nut 19 is placed on the bolt 16 and turned to obtain a longitudinal strain on said bolt and a lateral strain on members 14, 15, 9, 10 and 11. When it is found that said last named strains have been relieved by the curvature of the ends of the horns in response thereto, the nut 19 is again turned on bolt 16 and an additional strain thereby put thereon.

It will be observed that after the bolt 16 has been extended between the bars of turn-buckle 9 said turn-buckle cannot be turned on bolts 10, 11, and the distance between the rivets or pivots 12 cannot be changed, and said rivets and the ends of arms 8 will, continuously thereafter remain unchanged so far as the distance between them is concerned, and they will be forced vertically towards members 14, 15 by the several tightenings of nut 19, and thereby the cups 4, 5 will, respectively, be turned and forced ultimately into the position indicated by broken lines in Fig. 1. By repeating the last above described tightening of the nut 19 the desired inward curve of the horns on which the device is applied can be obtained.

I have applied the device to animals over four years old with satisfactory results, a longer time between the tightening of the turn-buckle being, however, required than when it is applied to animals of approximately two years old.

I claim:

In a horn deflector, cups, means to secure said cups on the horns of an animal, a turn-buckle provided with internal screw threads at the ends thereof, bolts provided with external screw threads corresponding with and fitting into said internal screw threads, means to secure said bolts in an adjusted position relative to said turn-buckle, and means to pivotally connect said bolts to said cups, in combination with additional members adapted to be placed on the horns of an animal adjacent to the head of said animal, means to secure said additional members in an adjusted position on said horns, and a bolt extendible through said additional members and through said turn-buckle, and means to control the relative position of said additional members and said turn-buckle.

CHARLES ACHENBACH.